(12) United States Patent
Miyazaki

(10) Patent No.: US 6,344,984 B1
(45) Date of Patent: Feb. 5, 2002

(54) VOLTAGE MULTIPLIER HAVING AN INTERMEDIATE TAP

(75) Inventor: Kiyoshi Miyazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/653,864

(22) Filed: Sep. 1, 2000

(30) Foreign Application Priority Data

Sep. 3, 1999 (JP) .......................................... 11-250113

(51) Int. Cl.[7] .............................................. H02M 3/18

(52) U.S. Cl. .......................... 363/60; 307/110; 327/536

(58) Field of Search ..................... 363/59, 60; 307/110; 327/536

(56) References Cited

U.S. PATENT DOCUMENTS 5,532,916 A * 7/1996 Tamagawa .................... 363/62

FOREIGN PATENT DOCUMENTS

JP 10031200 3/1998 ........... G02F/1/133

* cited by examiner

Primary Examiner—Peter S. Wong
Assistant Examiner—Gary L. Laxton
(74) Attorney, Agent, or Firm—Young & Thompson

(57) ABSTRACT

A power supply circuit for use in a LCD device includes a voltage multiplier which outputs a multiplied voltage VLCD1 and a median voltage VLCD2. A plurality of voltage followers are grouped in two groups each operating on the multiplied voltage VLCD1 or the median voltage VLCD2, thereby reducing power dissipation of the LCD device.

12 Claims, 9 Drawing Sheets

VOLTAGE MULTIPLIER HAVING AN INTERMEDIATE TAP

BACKGROUND OF THE INVENTION (a) Field of the Invention

The present invention relates to a voltage multiplier having an intermediate tap and, more particularly, to a voltage multiplier for use in a LCD driver IC for driving a LCD panel.

(b) Description of the Related Art

A LCD driver IC for driving a LCD panel generally includes a power supply circuit outputting relatively high source voltages ranging between 5 and 20 volts. On the other hand, most current ICs including logic IC and memory IC use a relatively low voltage ranging between 3 and 5 volts. Thus, the power supply circuit in the LCD driver IC includes a voltage multiplier for multiplying a source voltage of 3 to 5 volts up to two to five times the supplied source voltage.

The power supply circuit in the LCD device, especially used in a personal digital assistant, generates a plurality of intermediate voltages in addition to the highest operatioanl voltage. FIG. 1 shows a typical power supply circuit including a conventional voltage multiplier.

The power supply circuit 30 includes a voltage multiplier block 31 for multiplying an input source voltage VDD by "n" to generate a multiplied voltage VLCD equal to n×VDD where "n" is an integer. The power supply circuit 30 also includes a voltage generator block 32 which receives the multiplied voltage VLCD to generate a plurality of voltage levels V1 to V5 including a highest voltage V1 and a lowest voltage V5.

The voltage generator block 32 includes a voltage divider 33 implemented by resistors R1 to R5, a voltage follower A1 which operate on a source voltage of VLCD and receives a reference voltage Vref to generate the voltage level V1, and a plurality of voltage followers A2 to A5 each of which operates on a source voltage of VLCD and receives one of output voltages of the voltage divider 33 to output a corresponding one of the voltage levels V2 to V5.

In the conventional power supply circuit 30, power dissipation can be suppressed by employing a higher resistance for the voltage divider 33, reducing penetrating current flowing through the output stages of the voltage followers A1 to A5, and stopping the bias current for the voltage followers A1 to A5 during a standby mode of the LCD device.

Due to the employment of lower power supply voltage, which is now reduced down to 1.5 to 2.0 volts, in the latest logic LSI, the multiplication factor of the voltage multiplier 31 has increased up to 6 to 9 times. Thus, further reduction of the power dissipation is requested in the power supply circuit 30 along with the current driveability of the voltage multiplier 31. The current driveability of the voltage multiplier 31 generally involves a larger chip area for the LCD driver, which is undesirable especially in a personal digital assistant.

Patent Publication JP-A-10-31200 describes a power supply circuit for a LCD driver such as shown in FIG. 2. The power supply circuit 40 includes a first voltage generator 41 for generating higher voltage levels V1 and V2, and a second voltage generator 42 for generating lower voltage levels V3 and V4. The first voltage generator 41 operates on a source voltage between a positive voltage level V0 of a power source 43 and a median voltage level Vx, whereas the second voltage generator 42 operates on a source voltage between the median voltage level Vx and the negative voltage level V5 of the power source 43.

The median voltage level Vx is generated from the positive voltage level V0, the negative voltage level V5 and bipolar transistors Tp and Tn. If the total output current from the operational amplifiers OP1 and OP2 constituting the voltage followers in the first voltage generator 41 is equal to the total output current from the operational amplifiers OP3 and OP4 in the second voltage generator 42, the median voltage Vx is maintained at the exact median potential between voltage levels V0 and V5. In this case, the power dissipation is reduced down to a half the power dissipation by the power supply circuit of FIG. 1.

In an ordinary LCD device, specified voltage levels are often used in the LCD panel at a time. For example, if the first voltage generator 41 operates for driving a LCD panel, electric charge generated by the driving is temporarily stored in a capacitor C1 connected between the median voltage line Vx and the negative source line. On the other hand, if the second voltage generator 42 operates for driving, the driving current reduces the charge stored in the capacitor C1. The capacitor C1 alleviates a voltage fluctuation on the median voltage line Vx. However, if the unbalance of the drive current continues, the median voltage line Vx may rise or fall from the median voltage by a threshold. The rise or fall of the median voltage line Vx above the threshold is cancelled by turn on of the bipolar transistor Tp or Tn.

The turn on of the transistor Tp or Tn results in flow of the current from the V0 line to the Vx line or from the Vx line to the V5 line, and causes a power dissipation. In addition, the function of the capacitor C1 is limited if the multiplication factor of the voltage multiplier increases.

SUMMARY OF THE INVENTION

It is therefore an object of the present invention to provide a voltage multiplier which is capable of reducing power dissipation in the case of providing an intermediate voltage level in addition to the multiplied voltage from the power supply circuit having the voltage multiplier.

The present invention provides a voltage multiplier including a plurality of capacitors, a switching assembly for iteratively switching between a first position for connecting the capacitors in parallel for charging the capacitors with a first voltage and a second position for connecting the capacitors in series to form a serial branch, the serial branch having a first end outputting a second voltage, at least one first switch having a terminal connected to an intermediate position of the serial branch, the first switch being turned on, when the switching assembly connects the capacitors in series, to output a third voltage which is higher than the first voltage and lower than the second voltage.

In accordance with the voltage multiplier of the present invention, since the power supplied on the third voltage is substantially equal to the corresponding power supplied on the first voltage, the power dissipation in a LCD panel, for example, driven by the voltage levels generated based on the third voltage is reduced compared to the LCD panel driven by the voltage levels generated based on the multiplied voltage generated by the conventional voltage multiplier.

The above and other objects, features and advantages of the present invention will be more apparent from the following description, referring to the accompanying drawings.

PREFERRED EMBODIMENT OF THE INVENTION

Figure 1:
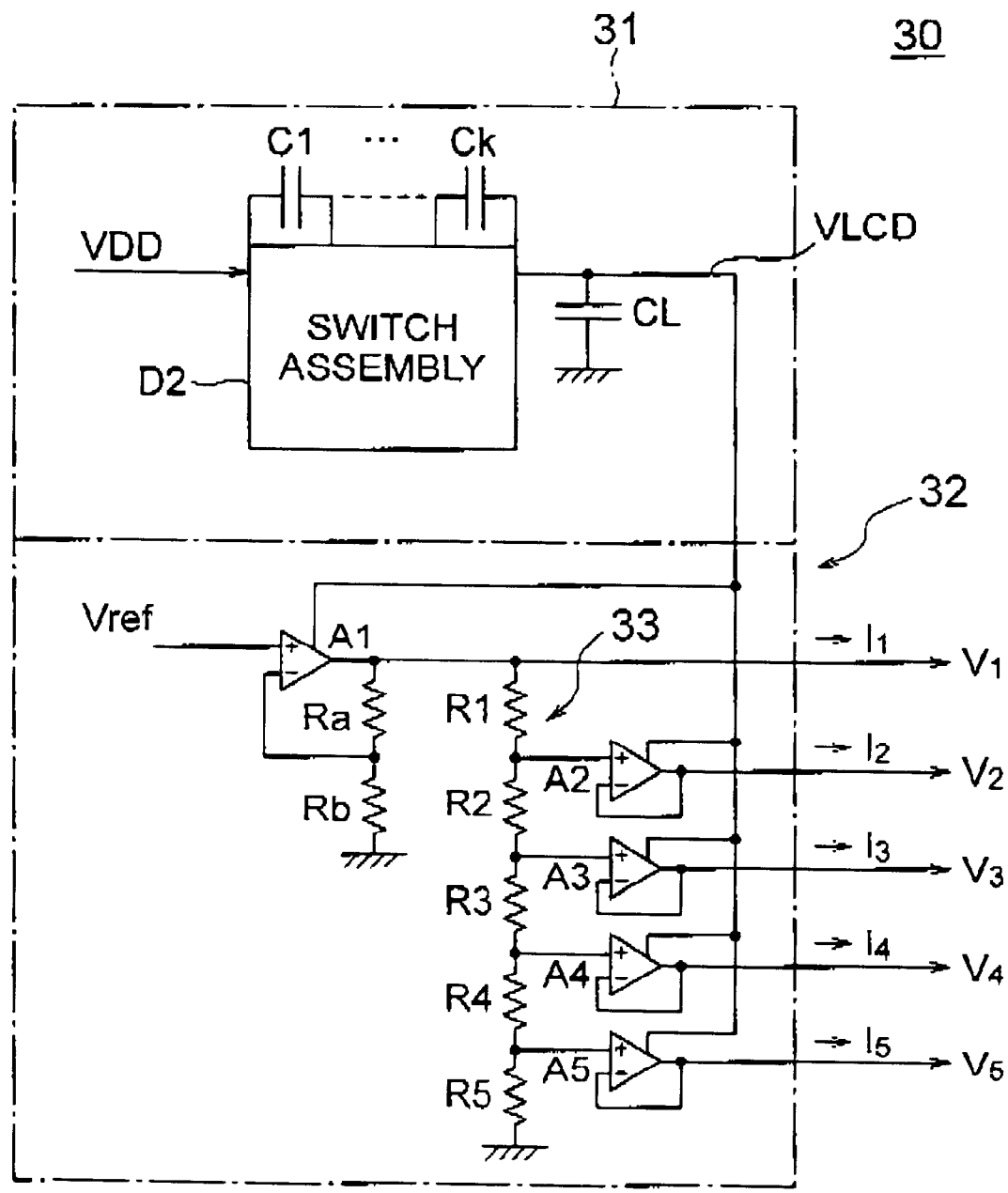
FIG. 1 is a circuit diagram of a conventional power supply circuit for a LCD driver.
Figure 2:
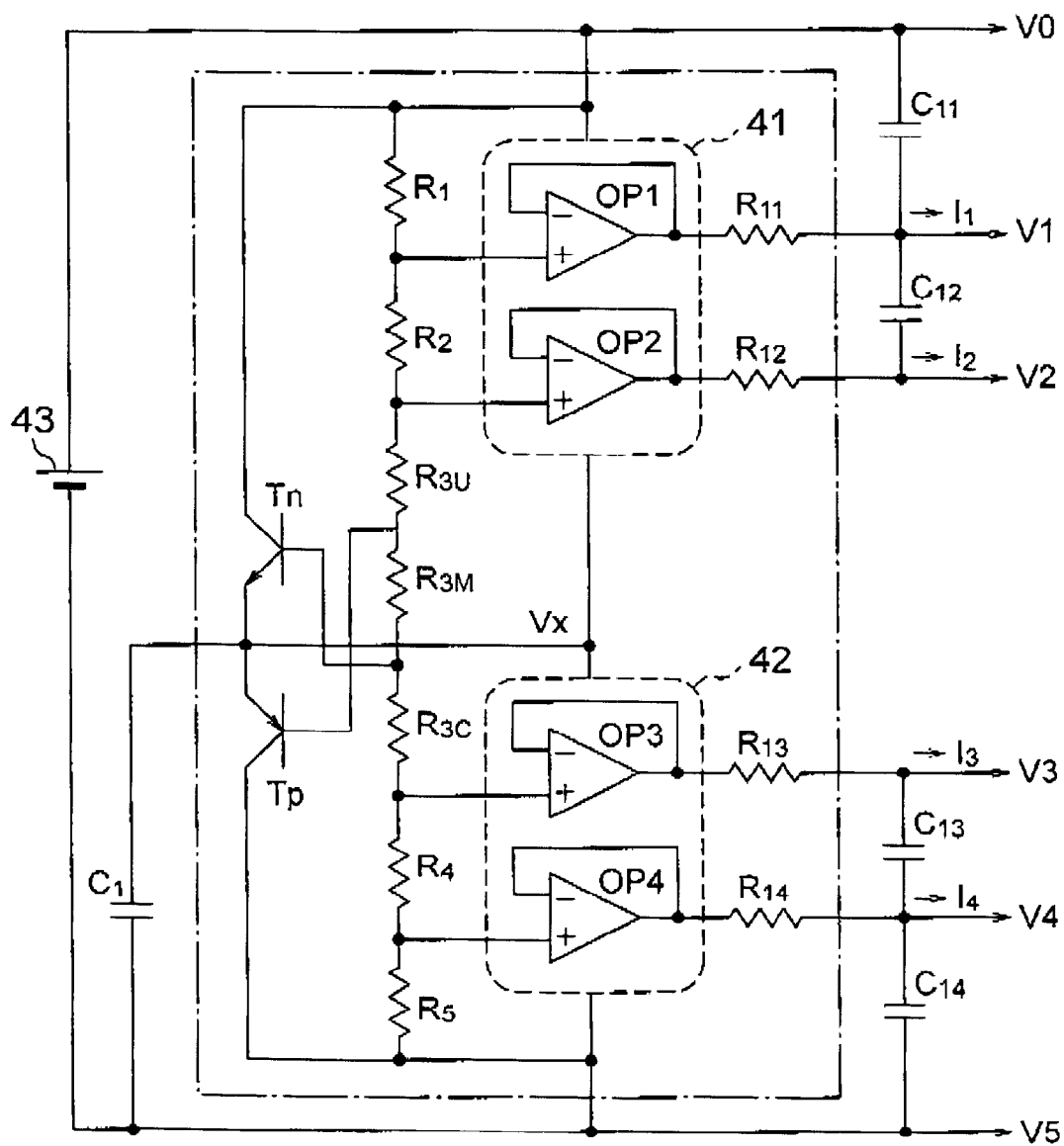
FIG. 2 is a circuit diagram of another conventional power supply circuit for a LCD drier.

Now, the present invention is more specifically described with reference to accompanying drawings, wherein similar constituent elements are designated by related reference numerals.

Figure 3:
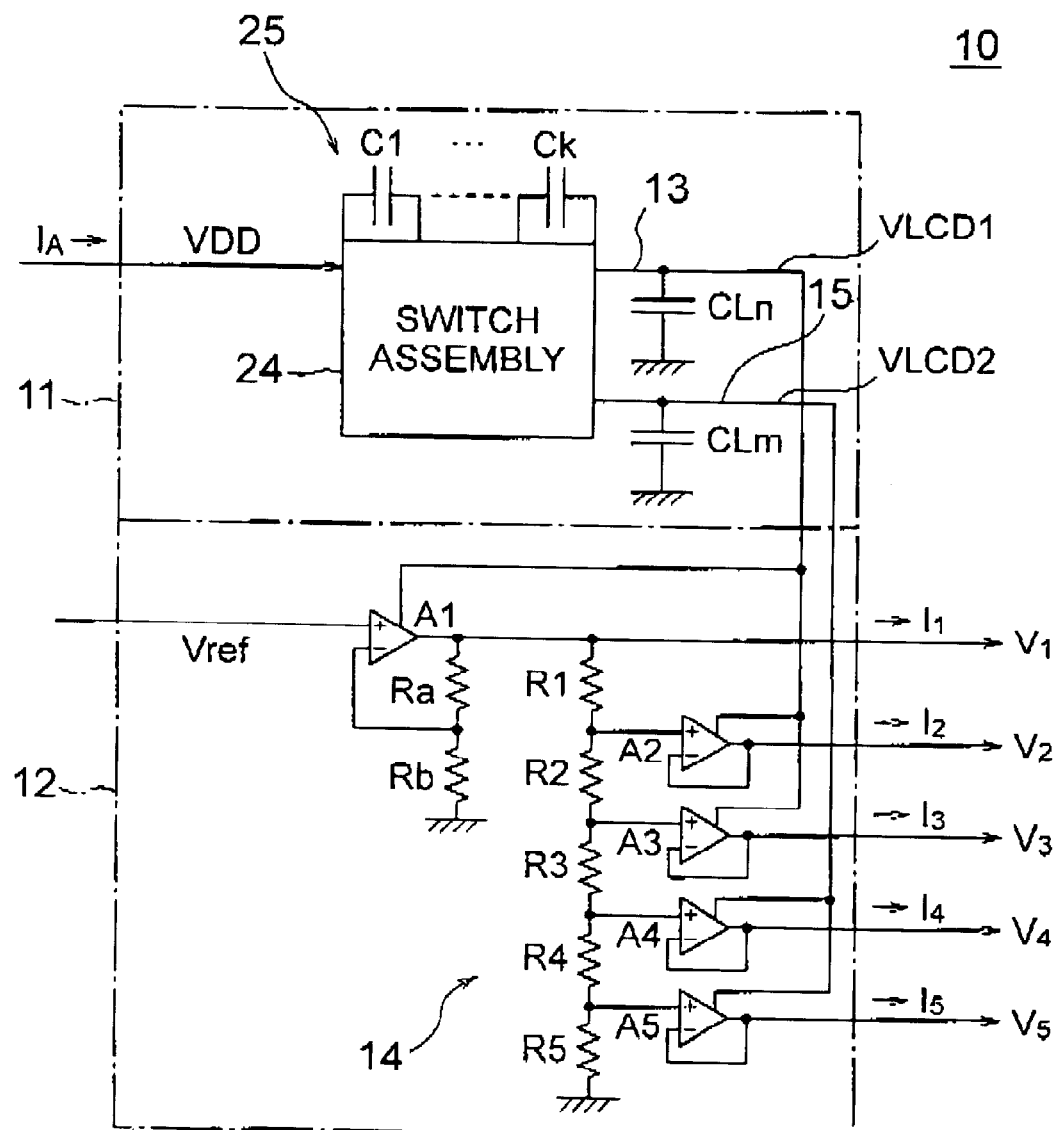
FIG. 3 is a circuit diagram of a power supply circuit having a voltage multiplier according to a first embodiment of the present invention.

Referring to FIG. 3, a power supply circuit, generally designated by numeral 10, includes a voltage multiplier block 11, according to an embodiment of the present invention, for receiving an input voltage source VDD to output a pair of multiplied voltages VLCD1 and VLCD2, wherein VLCD1=n×VDD and VLCD2=m×VDD (n and m are integer and n>m), and a voltage generator block 12 for receiving the multiplied voltages VLCD1 and VLCD2 to output a plurality of voltage levels V1 to V5 to a LCD panel not shown.

The voltage multiplier block 11 includes a switching assembly or control section 24 for receiving the input voltage source VDD, a capacitor group 25 including a plurality of capacitors C1 to Ck controlled by the control section 24 between a serial connection and a parallel connection thereof, and a pair of smoothing capacitors CLn and CLm for smoothing the output lines VLCD1 and VLCD2 of the voltage multiplier block 11.

The voltage generator block 12 includes an operational amplifier A1 and a plurality of voltage followers each implemented by an operational amplifier A2, . . . or A5. The operational amplifier A1 operates on the multiplied voltage VLCD1 as the source voltage thereof, and has a non-inverting input for receiving a reference voltage Vref, an inverting input for receiving an output from a voltage divider (including resistors Ra and Rb) which divides the output of the operational amplifier A1, and an output for outputting a voltage level V1. Thus, the operational amplifier outputs the voltage level V1 which has a specified ratio with respect to the reference voltage Vref.

Each of the voltage followers A2 to A5 operates on the multiplied voltage VLCD1 or VLCD2 as the source voltage thereof, and receives at a non-inverting input thereof a corresponding output from a voltage divider (including resistors R1 to R5) 14 which divides the output voltage V1 supplied from the operational amplifier A1 and at the inverting input thereof an output from the each of the voltage followers A2 to A5. For example, the voltage level V1 is the highest voltage used in the LCD driver, whereas the voltage levels V2 to V5 are intermediate voltage levels. The operational amplifiers A1 and voltage followers A2 to A5 have low output impedances sufficient for driving the LCD panel.

The voltage multiplier 11 receives a low voltage source VDD from a logic IC and multiplies the voltage source VDD by "n" and "m" to output the multiplied voltage VLCD1= n×VDD and VLCD2=m×VDD. The number "n" is determined so that V1≦VLCD1=n×VDD. The number "m" is determined so that VLCD1/2≦VLCD2<VLCD1.

The input current IA of the voltage multiplier 11 supplied on a voltage source VDD is expressed by:

$$IA=n\times(I1+I2+I3)+m\times(I4+I5)$$

wherein I1 to I5 are currents supplied from the output lines V1 to V5, respectively. This affords reduction of the input current components of the input current IA corresponding to the currents I4 and I5. If integer "n" is an even number and integer "m" is set at m=n/2, then the input current components corresponding to the currents I4 and I5 can be reduced by ½ compared to the conventional voltage multiplier. If integer "n" is an odd number and integer "m" is set at m=(n+1)/2, then the input current components corresponding to the currents I4 and I5 can be reduced to ½+n/2 compared to the conventional voltage multiplier.

The multiplied voltage VLCD2 is output by a configuration incorporating, in a conventional voltage multiplier, a switch for outputting a median voltage through a median tap and a smoothing capacitor Clm for smoothing the median voltage as shown in FIG. 3. In this configuration, the median voltage VLCD2 is generated together with the multiplied voltage VLCD1, and not obtained by dividing the multiplied voltage VLCD1 using a resistor ladder.

Figure 4A:
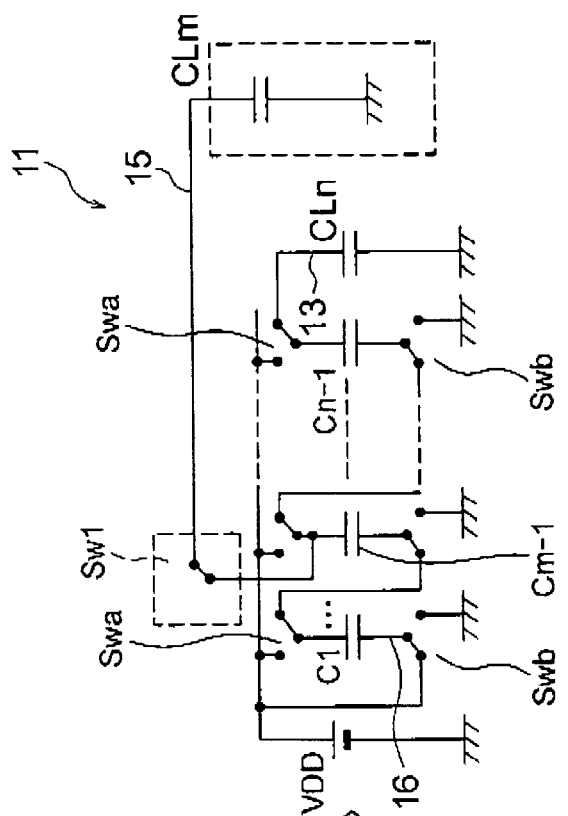
FIGS. 4A and 4B are operational circuit diagrams of the voltage multiplier shown in FIG. 3.
Figure 4B:
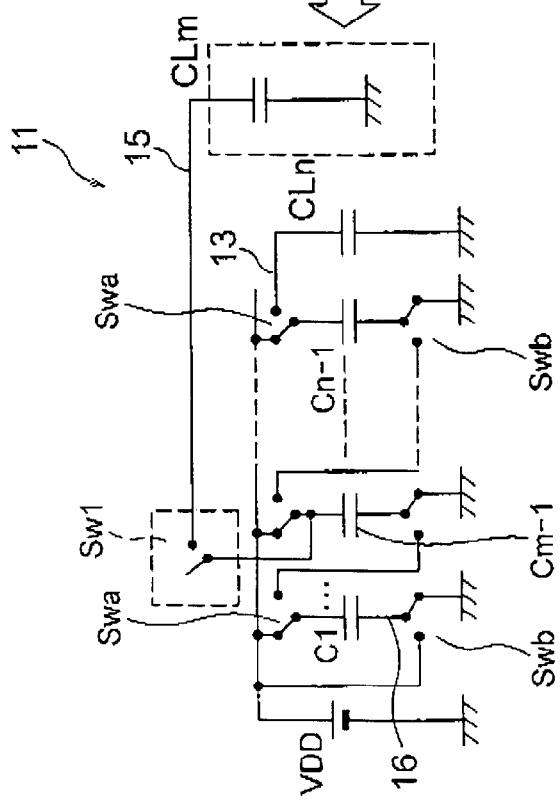

Referring to FIGS. 4A and 4B, there is shown a detailed configuration of the voltage multiplier block 11 where "n" is an even number and m=n/2. In FIG. 4A, the capacitor group is shown in a parallel connection wherein all the capacitors C1 to Cn are connected in parallel for charging the capacitors up to the source voltage VDD across the terminals of each capacitor. In FIG. 4B, the capacitor group is shown in a serial connection wherein all the capacitors C1 to Cn are connected in series for outputting the multiplied voltage VLCD1 at the distal end of the serial branch as well as the median voltage VLCD2 at the median point of the serial branch. The proximal end of the serial branch is connected to the VDD line.

The median voltage VLCD2 is delivered from a switch Sw1 which is now on. Both the multiplied voltages VLCD1 and VLCD2 are delivered as smoothed voltages by using the smoothing capacitors C1n and C1m. The control section 24 iteratively switches the capacitor group between the parallel connection and the serial connection for charging the capacitors C1 to Ck and outputting the multiplied voltages VLCD1 and VLCD2. In this configuration, the median voltage VLCD2 is delivered from the switch Sw1 connected to the (m−1)-th capacitor Cm−1.

Figure 5A:
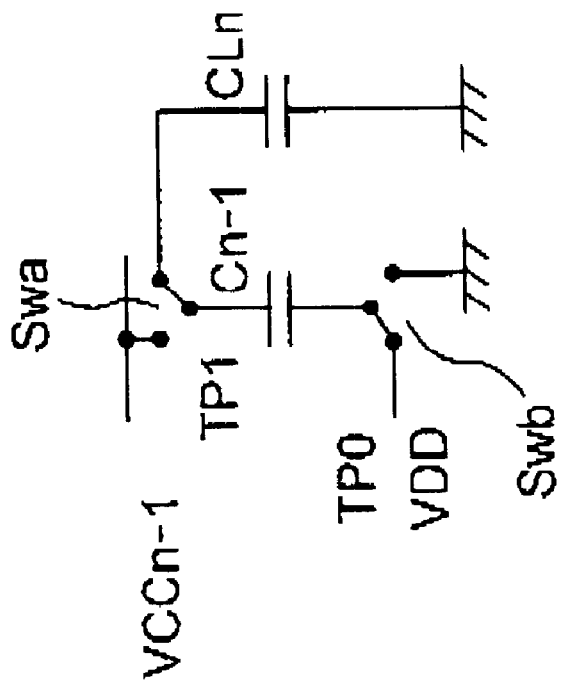
FIGS. 5A and 5B are operational circuit diagrams of a general charge pump circuit.
Figure 5B:
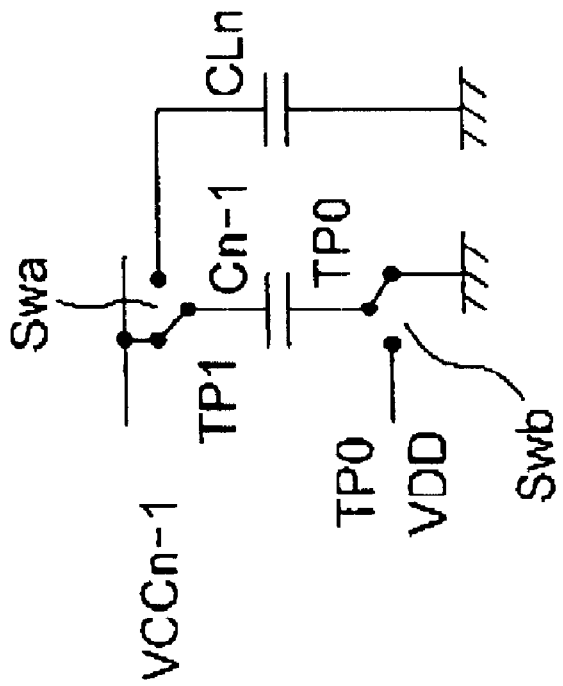

FIGS. 5A and 5B show the configuration of a general charge pump circuit. In FIG. 5A, the charge pump circuit supplies electric charge to capacitors C1 to Cn−1 (only Cn−1 is shown in the drawings) in a parallel connection by applying the input voltage VDD across each capacitor. In FIG. 5B, the charge pump circuit supplies electric charge to capacitor Cn by serially connecting the capacitors C1 to Cn−1 and biasing the output of the serial capacitors by the potential VDD. This configuration affords an output voltage of n×VDD. If an output voltage level which is equal to double the source voltage is sufficient, then the number of capacitors is two as shown in these figures which show Cn−1 and Cn.

Figure 6A:
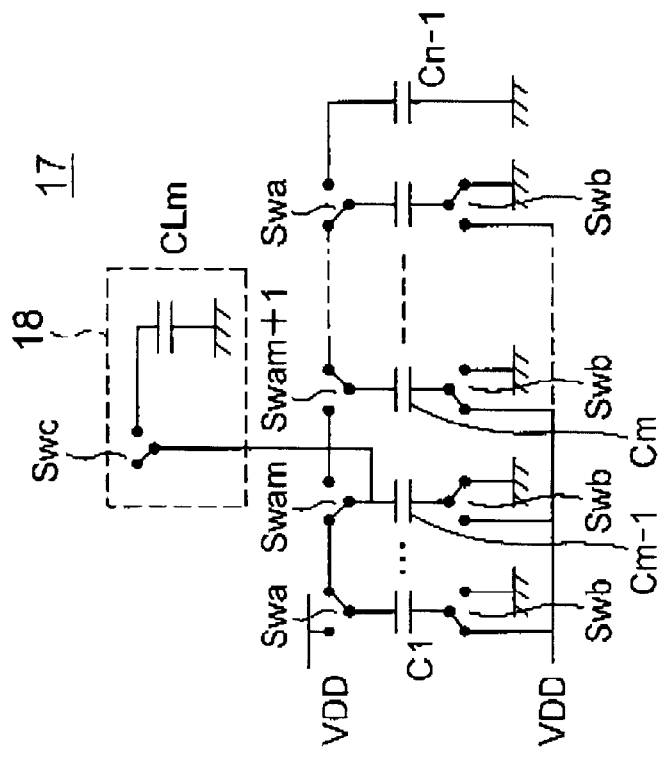
FIGS. 6A and 6B are operational circuit diagrams of a modification of the voltage multiplier of FIG. 3.
Figure 6B:
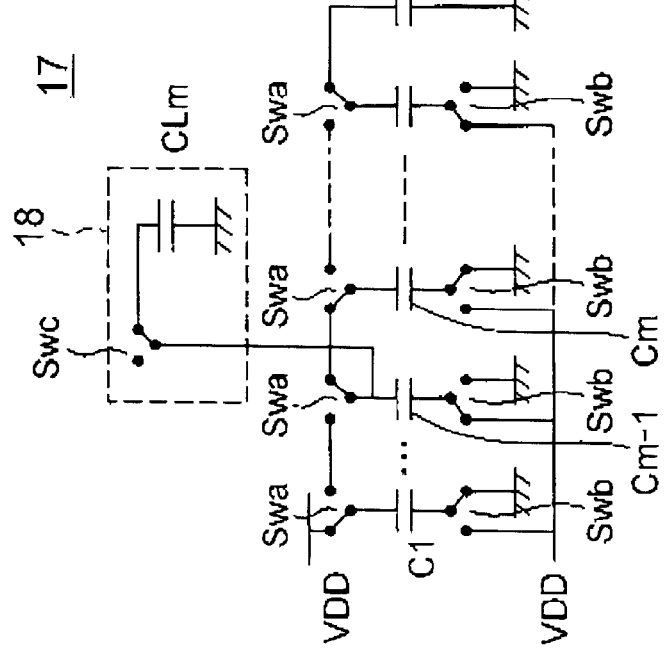

Referring to FIGS. 6A and 6B, the principle of the voltage multiplier according to the present invention is applied to the charge pump circuit such as shown in FIGS. 5A and 5B. The voltage multiplier includes an intermediate switch Swc at the terminal of (m−1)-th capacitor Cm−1 to output a median potential VLCD2=m×VDD in addition to a multiplied voltage VLCD1=n×VDD.

In the embodiment of FIGS. 6A and 6B, it is shown that the number of capacitors in the capacitor group is "n−1" corresponding to the n-fold multiplication by the voltage multiplier. If the number of multiplication is two, the number of capacitors to be employed for switching is one. In general, the number "k" of capacitors to be used for a n-fold multiplication may be selected as k≦n−1 so long as the switching is conducted by the control section at a suitable timing.

In the above embodiments, the median potential VLCD2 is generated from the median tap of the voltage multiplier and thus not generated by dividing the multiplied voltage VLCD1 using a voltage divider or other configuration. This affords lower power dissipation compared to the conventional power supply source, wherein the intermediate voltages are generated by a voltage divider.

In the above embodiments, each resistor in the voltage ladder should have a resistance as high as several kilo-ohms to several hundreds of kilo-ohms to reduce the power dissipation in either the operational stage or the idling stage of the LCD device. The voltage followers reduce the output impedance to the level sufficient for driving the relatively heavy loads in the LCD device.

The voltage levels V1 to V5 and the ground level GND constitute the suitable voltage levels used in the LCD device. Due to the symmetrical configuration of the voltage levels, the following relationships:

$$V4 \leq V1/2 \leq VLCD1/2$$

and, $$V5 \leq V1/2 \leq VLCD1/2$$

are satisfied between the voltage levels. The median voltage VLCD2 can be used for generating the voltage levels V4 and V5 in the LCD device for reducing the power dissipation.

Figure 7:
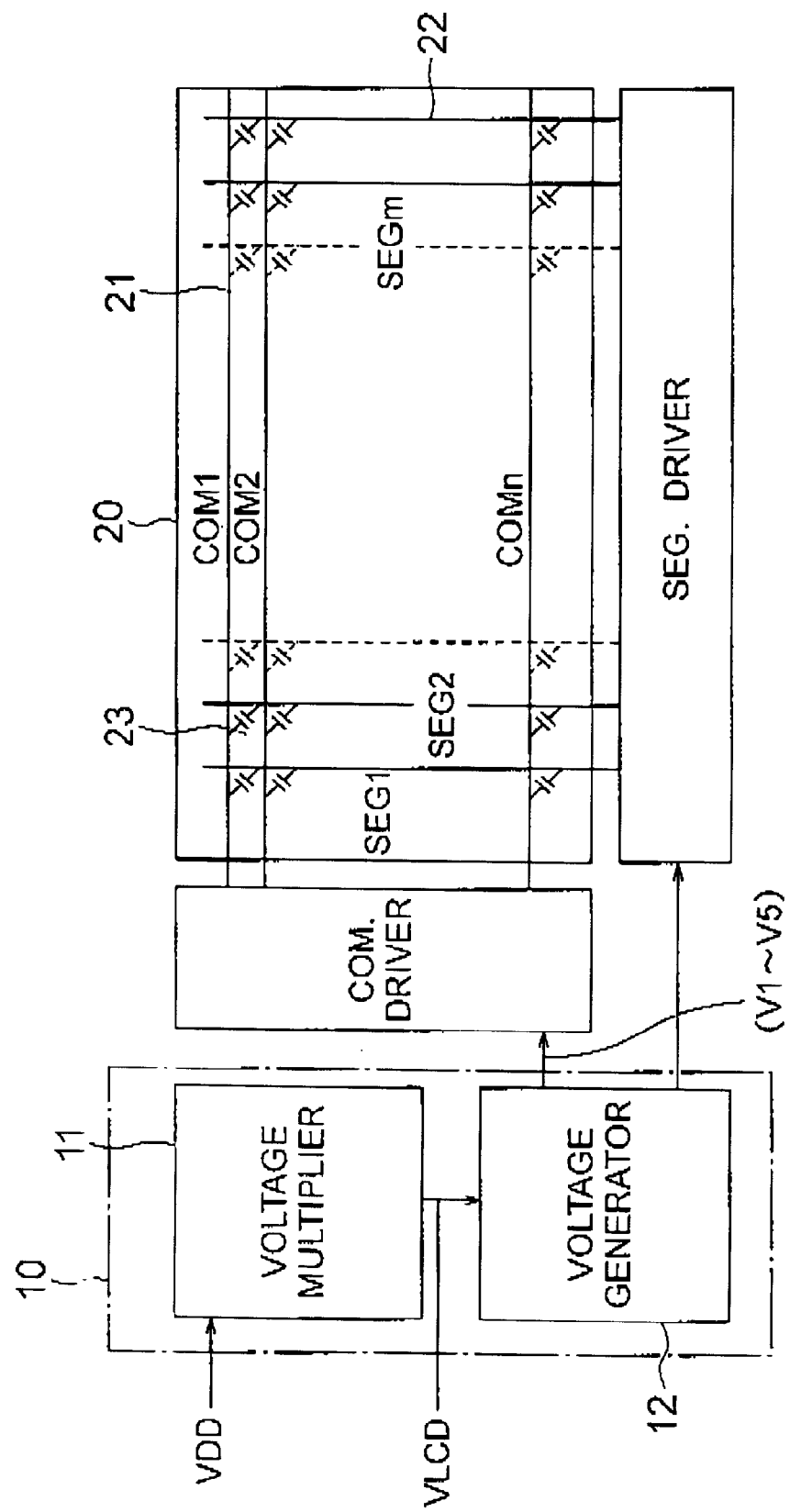
FIG. 7 is a block diagram of a LCD device having the power supply circuit of FIG. 3.

FIG. 7 shows a block diagram of a LCD device including a LCD driver having the power supply circuit of FIG. 3 and a typical LCD panel to be driven by the LCD driver. The LCD panel includes first and second glass substrates mounting thereon an electrode assembly, and a LC layer sandwiched between the glass substrates. The electrode assembly includes a plurality of scanning electrodes (or common electrodes; COM) 21 extending in the horizontal or row direction on the first substrate, and a plurality of segment electrodes (or data electrodes: SEG) 22 extending in the vertical or column direction on the second substrate.

The cross point between the common electrode 21 and the segment electrode 22 forms a pixel element constituting an equivalent capacitor 23. The voltage applied between the common electrode 21 and the segment electrode 22 generates a voltage across the equivalent capacitor 23, whereby an image corresponding to the applied voltage appears on the pixel element. The applied voltage is generally an alternating signal, which prevents the LC layer from a deterioration thereof such as burning. The alternating voltage reverses the polarity of the voltage level every frame at a constant rate. The reverse of the polarity may be effected by a frame reversing drive technique wherein the polarity of all the common electrodes 21 are reversed in synchrony with the scanning, or may be effected by a line reversing technique wherein the polarity of several to several tens of common electrodes 21 are reversed in synchrony with the scanning.

In a typical LCD device, the number of voltage levels needed for driving the LCD panel is above four except for the case of a small LCD panel such as having several dots in each of the horizontal and vertical directions. More specifically, in the current LCD device, VDD is generally 2 to 3 volts and VLCD1 is generally 10 to 20 volts.

Table 1 shows the voltage levels selected in the typical LCD drivers including a common electrode driver and a segment electrode driver, wherein the number of voltage levels are six including the GND level. In the table, a positive (+) frame is such that the selected common electrodes are of positive polarity with respect to the selected segment electrodes and a negative (−) frame is such that the selected common electrodes are of negative polarity with respect to the selected segment electrodes. The positive frames and the negative frames occur alternately.

TABLE 1

|  | (+) frame | | (−) frame | |
| --- | --- | --- | --- | --- |
|  | selected | non-selected | selected | non-selected |
| common driver | V1 | V5 | GND | V2 |
| segment driver | GND | V4 | V1 | V3 |

As understood from Table 1, four voltage levels are used in each frame among the six voltage levels, and if the GND level is out of consideration, three voltage levels are used in each frame among the five voltage levels generated by the voltage generator block. More specifically, voltage levels V1, V4 and V5 are used in the positive frame, whereas voltage levels V1, V2 and V3 are used in the negative frame. In the table, V1>V2>V3>V4>V5>GND holds, and in the typical LCD device, the voltage difference between each adjacent two voltage levels is constant:

$$V1-V2=V2-V3=V3-V4=V4-V5=V5=GND-V1/a.$$

Thus, in the positive frame, voltage levels needed for driving the LCD panel are lower than V1/2 except for V1 itself. Since the voltage levels V5 and V4 are lower than V1/2, the voltage levels V5 and V4 can be generated from the median voltage VLCD2=VLCD1/2 supplied from the median tap by using the VLCD2 for the source voltage of the voltage followers used for generating the lower voltage levels.

By using the median voltage, the power dissipation can be reduced compared to the conventional power supply circuit. In a generalized case wherein VLCD1=n×VDD and VLCD2=m×VDD, the power dissipation for the median potential VLCD2 can be reduced down to m/n compared to the conventional power supply circuit.

Figure 8:
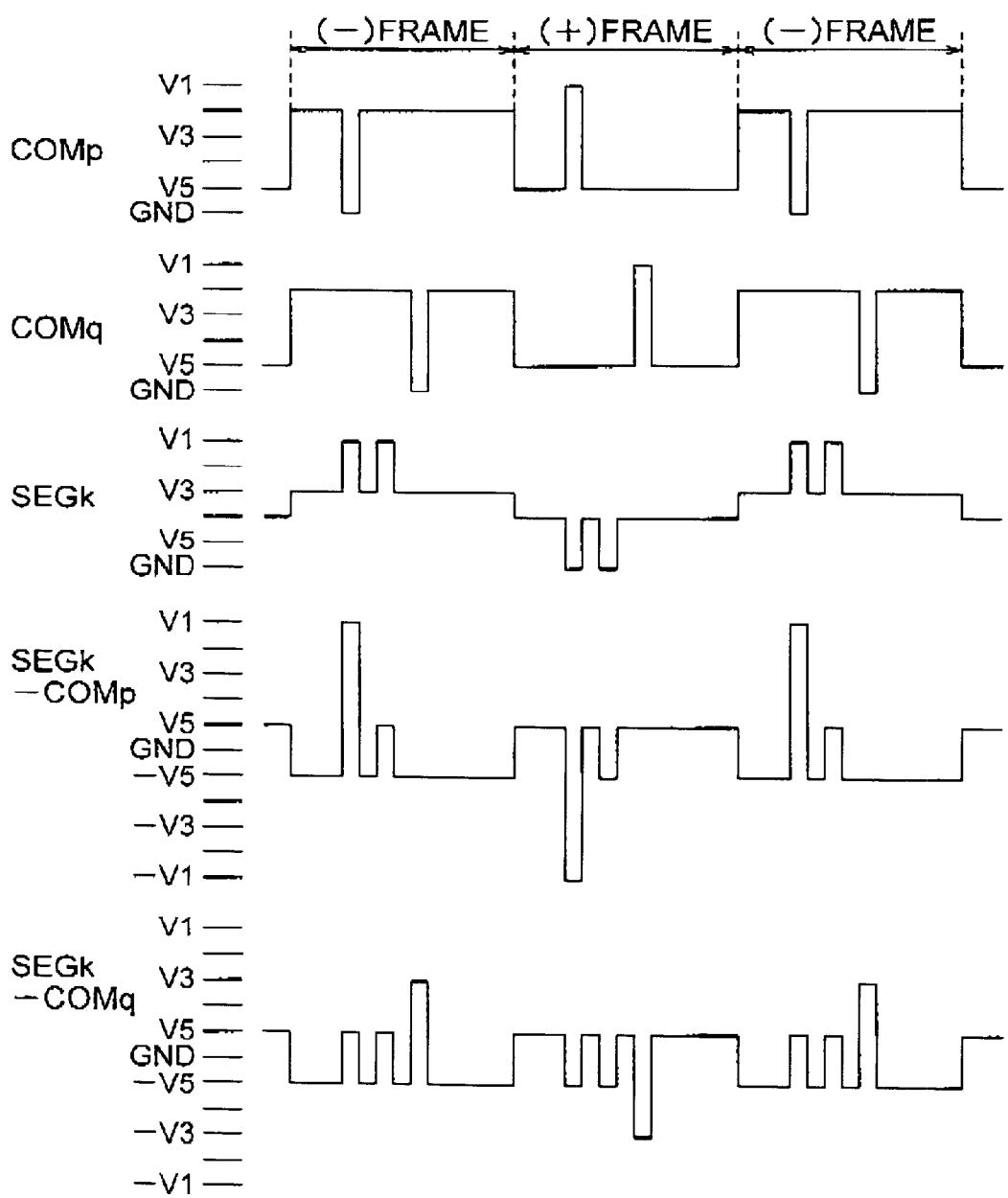
FIG. 8 is a timing chart of signals in the LCD device of FIG. 7.

The reduction of the power dissipation by the present embodiment will be discussed with reference to FIG. 8. In the example of FIG. 8, common electrodes (COMp and COMq) are consecutively scanned by applying the voltage level V1 in the positive frame and voltage level GND in the negative frame, whereas a segment electrode SEGk is applied with the voltage level GND or V4 in the positive frame and with the voltage level V1 or V3 in the negative frame, depending on the display data for the row corresponding to the selected common electrodes.

The cell voltage or pixel voltage is obtained by subtracting the voltage level of the common electrode COMp or COMq from the voltage level of the segment electrode SEGk. If the difference SEGk−COMp or SEGk−COMq thus obtained increases from the previous stage in each frame, then the equivalent capacitor for the pixel is charged, whereas if the difference is reduced, then the equivalent capacitor for the pixel is discharged.

It is derived from the waveforms of SEGk−COMp and SEGk−COMq FIG. 8 that the charge or discharge of the equivalent capacitor is effected to V1 level, V3 level and V5 level.

Since the drive of the LCD panel is equivalent to the charge or a discharge of the equivalent capacitor, the most part of the drive current of the LCD panel is obtained from the charge current consumed during raising the pixel voltage up to V1, V3 or V5 level. It is to be noted that the charge current in the positive frame is equal to the charge current in the negative frame due to the symmetry of the drive voltage between frames. Thus, the drive current IL for the voltage level V5 can be considered to equal to the sum of the drive currents consumed during raising the pixel voltage up to the voltage levels V1 and V3.

Assuming that the bias current for each of the operational amplifiers A1, A2, ... A5 is equal to the bias current for the others of the operational amplifiers, and it is represented by $I_{bias}$, the current $I_{op1}$ consumed in the operational amplifiers A1, A2 and A3 operating on the multiplied voltage VLCD1 and the current $I_{op2}$ consumed in the operational amplifiers A4 and A5 operating on the median voltage VLCD2 are expressed by:

$$Iop1 = I1+I2+I3 = 3I_{bias}+IL+If_{123}$$

$$Iop2 = I4+I5 = 2I_{bias}+IL+If_{45}$$

wherein $If_{123}$ is the sum of the currents consumed in the amplifiers A1, A2 and A3 during the frame switching and $If_{45}$ is the sum of the currents consumed in the amplifiers A4 and A5 during the frame switching.

The currents Iop1 and Iop2 are consumed by the voltage multiplier block at respective voltage levels, and can be expressed in terms of the current on the VDD level after multiplying the consumed currents by the multiplied number, in consideration of the power dissipation. In the conventional power supply circuit, the current on the VDD level is expressed by:

$$n \times (5I_{bais}+2IL+If_{123}+If_{45}) \approx 5nI_{bias}+2n \times IL$$

On the other hand, in the present embodiment, the current at the VDD level is expressed by:

$$n \times (3I_{bias}+IL+If_{123})+m \times (2I_{bias}+IL+If_{45}) \approx (3n+2m) \times I_{bias}+(n+m) \times IL$$

Since "m" is equal to n/2 or (n+1)/2, the current at VDD level can be reduced depending on m/n.

Since the frame frequency is generally 1/10 to 1/100 of the frequency of the data frequency, and the charge current is the product of the frame frequency and the equivalent capacitor and the pixel voltage, the currents $If_{123}$ and $If_{45}$ are negligibly small compared to the drive current IL.

In the voltage multiplier according to the embodiment, with a multiplying number "n" equal to or larger than four, m/n resides between 0.5 and 0.6, whereby the operational current of the operational amplifiers is reduced by:

$$(3n+2m)/5n \approx 0.8 \text{ to } 0.84$$

Thus, the operational current of the driver for the LCD panel is reduced by:

$$(n+m)/n \approx 0.75 \text{ to } 0.8$$

Accordingly, the LCD driver of the present embodiment can reduce the operational current in the LCD device down to 75% to 84% of the current consumed by the conventional LCD driver.

The reduction of the power dissipation also affords smaller dimensions of the transistor elements in the LCD driver IC. The smaller power dissipation and the smaller dimensions in combination provide feasibility of fabrication of a single chip LCD driver IC.

Figure 9:
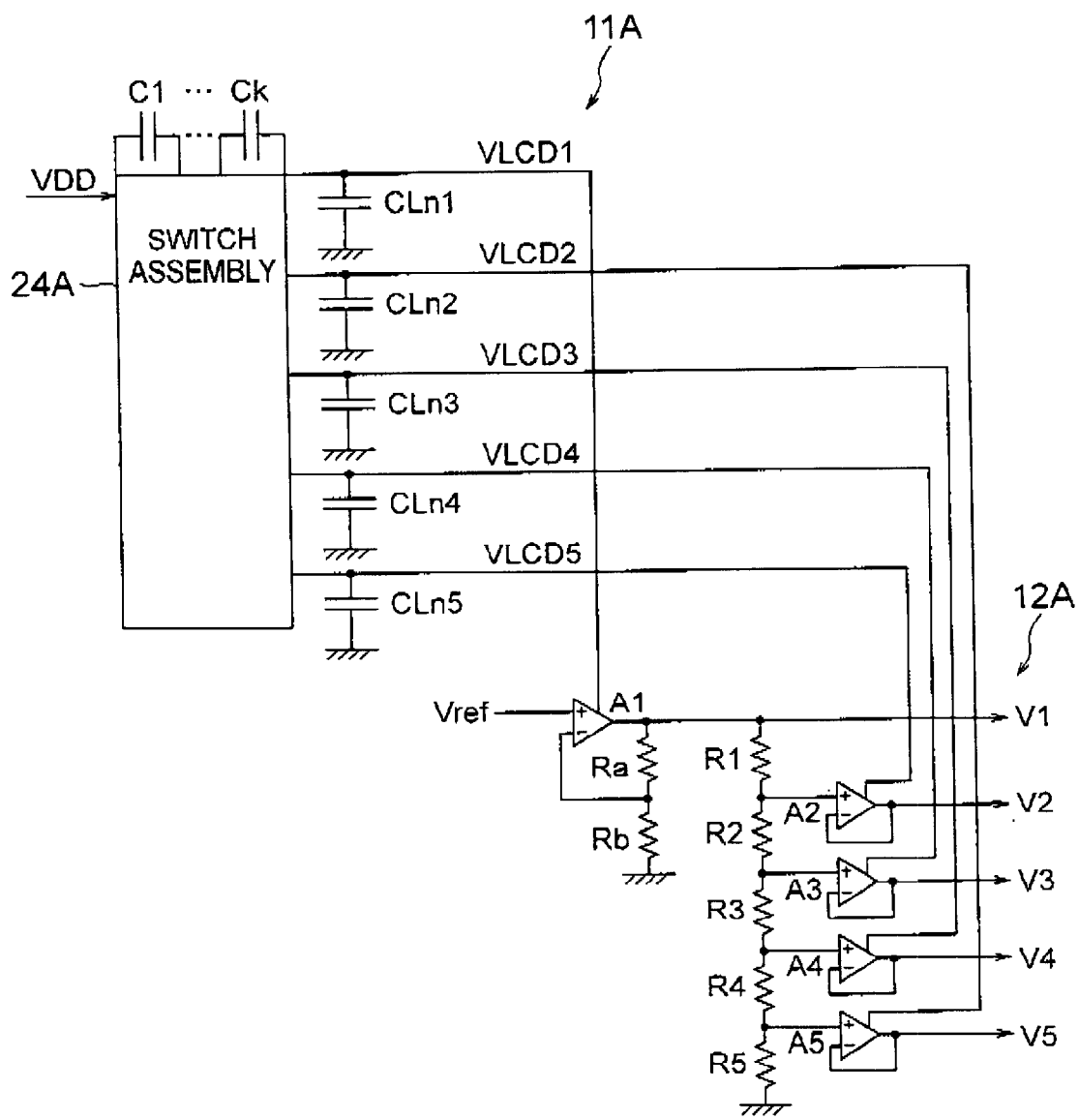
FIG. 9 is a circuit diagram of a power supply circuit having a voltage multiplier according to a second embodiment of the present invention.

Referring to FIG. 9, a power supply circuit for use in a LCD device, according to a second embodiment of the present invention, includes a voltage multiplier block 11A and a voltage generator block 12A. The voltage multiplier block 11A receives a source voltage VDD to output five multiplied voltage levels VLCD1 to VLCD5 to the voltage generator block 12A.

The voltage generator block 12A includes an operational amplifier A1 which receives a reference voltage Vref, based on which the operational amplifier A1 generates voltage level V1. The voltage generator block 12A also includes four voltage followers, including operational amplifiers A2 to A5, for receiving the voltage levels VLCD2 to VLCD5 to output voltage levels V2 to V5, respectively.

The relationship between the multiplied voltages VLCD1 to VLCD5, source voltage VDD and the voltage levels V1 to V5 are as follows:

$$VLCD1 = n1 \times VDD > V1,$$

$$VLCD2 = n2 \times VDD > V2,$$

$$VLCD3 = n3 \times VDD > V3,$$

$$VLCD4 = n4 \times VDD > V4,$$

and $$VLCD5 = n5 \times VDD > V5,$$

wherein n1 to n5 (n1>n2>n3>n4>n5) are multiplied numbers for the multiplied voltages VLCD1 to VLCD5, respectively.

The total current consumed at the VDD level is expressed by:

$$n1 \times I1+n2 \times I2+n3 \times I3+n4 \times I4+n5 \times I5,$$

which is significantly small compared to the current:

$$n1 \times (I1+I2+I3+I4+I5)$$

consumed in the conventional power supply circuit.

For example, assuming that n1=5, n2=4, n3=3, n2=2 and n1=1, the current at the VDD level is reduced down to 60%. In the first embodiment, the current at the VDD level is reduced to 84%.

Since the above embodiments are described only for examples, the present invention is not limited to the above embodiments and various modifications or alterations can be easily made therefrom by those skilled in the art without departing from the scope of the present invention.

What is claimed is:

1. A voltage multiplier comprising:

a plurality of capacitors, a switching assembly for iteratively switching between a first position for connecting said capacitors in parallel for charging said capacitors with a first voltage and a second position for connecting said capacitors in series to form a serial branch, said serial branch having a first end outputting a second voltage, at least one first switch having a terminal connected to an intermediate position of said serial branch, said first switch being turned on, when said switching assembly connects said capacitors in series, to output a third voltage which is higher than said first voltage and lower than said second voltage, wherein the switching assembly is arranged so that the voltage multiplier simultaneously connects the second voltage and the third voltage to the capacitors while the capacitors are connected in series.

2. The voltage multiplier as defined in claim 1, wherein said serial branch has a second end maintained at a ground potential or a specified potential.

3. The voltage multiplier as defined in claim 1, wherein said intermediate position is substantially a middle point of said serial branch.

4. The voltage multiplier as defined in claim 1, further comprising a pair of smoothing capacitors including one of said smoothing capacitor having an electrode connected at said first end and another of said smoothing capacitors having an electrode connected at said intermediate position.

5. The voltage multiplier as defined in claim 1, wherein said at least one first switch comprises a plurality of said first switches, each of said first switches outputting a different respective said third voltage.

6. The voltage multiplier as defined in claim 5, further comprising at least one first voltage follower operating on said second voltage as a source voltage thereof and a plurality of second voltage followers each operating on a corresponding one of said plurality of third voltages as a source voltage thereof.

7. The voltage multiplier as defined in claim 1, further comprising at least one first voltage follower operating on said second voltage as a source voltage thereof and at least one second voltage follower operating on said third voltage as a source voltage thereof.

8. The voltage multiplier as defined in claim 7, wherein each of said voltage followers receives a reference potential at an input thereof.

9. A LCD device comprising:

a liquid crystal display element; and a voltage multiplier electrically connected to the liquid crystal display element, the voltage multiplier comprising:

a plurality of capacitors, a switching assembly for iteratively switching between a first position for connecting said capacitors in parallel for charging said capacitors with a first voltage and a second position for connecting said capacitors in series to form a serial branch, said serial branch having a first end outputting a second voltage, at least one first switch having a terminal connected to an intermediate position of said serial branch, said first switch being turned on, when said switching assembly connects said capacitors in series, to output a third voltage which is higher than said first voltage and lower than said second voltage, wherein the switching assembly is arranged so that the voltage multiplier simultaneously connects the second voltage and the third voltage to the capacitors while the capacitors are connected in series.

10. A voltage multiplier comprising:

a plurality of capacitors;

means for switching the capacitors between a first set of connections and a second set of connections, wherein the first set of connections electrically connects the capacitors in parallel with one another for charging, the second set of connections electrically connecting the capacitors in series with one another, the second set of connections being arranged so that two separate outputs are simultaneously connected to the capacitors while the capacitors are connected in series, the outputs being connected between separate pairs of said capacitors.

11. A voltage multiplier comprising:

a plurality of capacitors;

first and second outputs;

a plurality of switches, each of the switches having a first position and a second position; and a switching assembly connected to each of the switches so as to control whether each of the switches is in the first or second position;

wherein when the switching assembly puts each of the switches in the first position, each of the first and second outputs is disconnected from all of the capacitors, and the capacitors are electrically connected in parallel with one another; and wherein when the switching assembly puts each of the switches in the second position, the capacitors are electrically connected in series with one another, and the first and second outputs are simultaneously connected respectively to separate first and second positions in the series connection of capacitors so that the first and second outputs are simultaneously driven to different voltage levels.

12. The voltage multiplier of claim 11, further comprising at least one additional output, wherein each said additional output is simultaneously connected to a different position in the series connection of capacitors so that each of the first, second, and at least one additional outputs are simultaneously driven to different voltage levels.

* * * * *